United States Patent
Pedani

(10) Patent No.: US 11,891,144 B2
(45) Date of Patent: Feb. 6, 2024

(54) LEANING VEHICLE LOCKING SYSTEM COMPRISING A GEAR MOTOR

(71) Applicant: PIAGGIO & C. SPA, Pontedera (IT)

(72) Inventor: Giuseppe Pedani, Pontedera (IT)

(73) Assignee: PIAGGIO & C. S.P.A., Pontedera (IT)

(*) Notice: Subject to any disclaimer, the term of this patent is extended or adjusted under 35 U.S.C. 154(b) by 0 days.

(21) Appl. No.: 17/780,061

(22) PCT Filed: Dec. 29, 2020

(86) PCT No.: PCT/IB2020/062515
§ 371 (c)(1),
(2) Date: May 26, 2022

(87) PCT Pub. No.: WO2021/137153
PCT Pub. Date: Jul. 8, 2021

(65) Prior Publication Data
US 2022/0340222 A1    Oct. 27, 2022

(30) Foreign Application Priority Data
Dec. 30, 2019   (IT) .................. 102019000025723

(51) Int. Cl.
*B62J 27/00*    (2020.01)
*B62K 5/027*   (2013.01)
(Continued)

(52) U.S. Cl.
CPC .............. *B62J 27/00* (2013.01); *B62K 5/027* (2013.01); *B62K 5/08* (2013.01); *B62K 5/10* (2013.01);
(Continued)

(58) Field of Classification Search
CPC . B62J 27/00; B62K 5/027; B62K 5/08; B62K 5/10; B62K 5/05; F16H 1/225; B62L 3/00; F16D 65/18
See application file for complete search history.

(56) References Cited

U.S. PATENT DOCUMENTS

| 4,754,660 A | 7/1988 | Kobayashi |
| 5,107,967 A | 4/1992 | Fujita |
| 2023/0105090 A1* | 4/2023 | Nomura ................ B60T 13/741 188/72.3 |

FOREIGN PATENT DOCUMENTS

| EP | 1561612 A1 | 8/2005 |
| KR | 20080081379 A | 9/2008 |

(Continued)

OTHER PUBLICATIONS

International Search Report for corresponding application PCT/IB2020/062515 filed Dec. 29, 2020; dated Mar. 16, 2021.

(Continued)

*Primary Examiner* — Paul N Dickson
*Assistant Examiner* — Shams Dhanani
(74) *Attorney, Agent, or Firm* — CANTOR COLBURN LLP

(57) ABSTRACT

A locking system for a vehicle having a locking device and a gear motor operatively connected to the locking device and configured to cause the locking device to take a stable locking state and a release state, where the gear motor includes a drive motor having an input shaft, a first transmission wheel coupled to a first portion of the input shaft and a second transmission wheel coupled to a second portion of the input shaft.

11 Claims, 4 Drawing Sheets

(51) Int. Cl.
 *B62K 5/08* (2006.01)
 *B62K 5/10* (2013.01)
 *F16H 1/22* (2006.01)
 *B62K 5/05* (2013.01)
 *B62L 3/00* (2006.01)
 *F16D 65/18* (2006.01)

(52) U.S. Cl.
 CPC ................ *F16H 1/225* (2013.01); *B62K 5/05* (2013.01); *B62L 3/00* (2013.01); *F16D 65/18* (2013.01)

(56) References Cited

FOREIGN PATENT DOCUMENTS

| WO | 2001003643 A1 | 1/2011 |
| WO | 2013104335 A1 | 7/2013 |

OTHER PUBLICATIONS

Written Opinion for corresponding application PCT/IB2020/062515 filed Dec. 29, 2020; dated Mar. 16, 2021.

\* cited by examiner

LEANING VEHICLE LOCKING SYSTEM COMPRISING A GEAR MOTOR

TECHNICAL FIELD OF THE INVENTION

The present invention relates to a locking system for a vehicle comprising a gear motor operatively connected to a locking device, and to a vehicle comprising said locking system.

BACKGROUND OF THE INVENTION

With reference, for example and without limitation, to the field of motorcycles, "hybrid" vehicles are known, which combine the features of motorcycles, in terms of handling, with the stability of four-wheeled vehicles. Such vehicles are represented, for example, by three-wheeled vehicles provided with two front steering wheels and a rear wheel with a fixed axis. Advantageously, the three-wheeled vehicles of the aforesaid type can be driven like a motorcycle (driver tilting), while simultaneously offering the usual stability of four-wheeled vehicles. One vehicle of this type is described, for example, in European patent EP1484239B1 to the same applicant. In such a vehicle, two independent suspensions are provided, one for each of the two front wheels, equipped with shock absorbers, which are also independent, and a front steering system based on an articulated quadrilateral kinematic mechanism. The articulated quadrilateral kinematic mechanism allows the front wheels to remain substantially adjacent to the ground during the operations of steering and/or "leaning" of the vehicle. Due to the structural peculiarity of this type of vehicles, under some travelling conditions, e.g., in the case of a very low speed, or during standstills and stops, it is possible that the vehicle may fall due to the rolling movement induced by the articulated quadrilateral mechanism.

In order to overcome the aforesaid drawback, the provision of an anti-roll locking system in this type of vehicles is known, which ensures the stability of the vehicle under all vehicle travelling conditions and when the vehicle has stopped or is at a standstill. An example of an anti-roll locking system is described in European patent EP1561612B1 to the same applicant. The anti-roll locking system described in that patent specifically comprises a stop element, in particular a portion of a brake disk, which is integral with an element of the articulated quadrilateral mechanism in the rolling movements thereof. Furthermore, the anti-roll locking system comprises a locking element, in particular a brake caliper, for locking the position of the stop element in order to prevent the rolling movements of the articulated quadrilateral mechanism structure. The anti-roll locking system also comprises a parking assembly operatively connected to the locking element for controlling the locking element itself. Specifically, the parking assembly is operatively connected to the brake caliper to cause the brake caliper to take a stable locking state, in which it locks the stop element, and thus the articulated quadrilateral mechanism, and a release state, in which it releases the stop element allowing the rolling movement of the articulated quadrilateral mechanism. The parking assembly typically comprises a gear motor provided with an endless screw coupled to a wheel with helical teeth. One drawback of the locking system described above is linked to the fact that it requires the use of costly components to ensure the correct operation of the locking system, i.e. to ensure the stability of the locking and release states of the locking device, while simultaneously keeping the overall size of the locking system to a minimum. In fact, in order to manufacture the locking system with small overall size and simultaneously ensure such a high friction coefficient between the teeth of the wheel with helical teeth and the endless screw as to ensure the irreversibility of the movement of the gear motor in the locking and release states of the brake caliper, a costly gear wheel with helical teeth made of special materials is typically used, such as a gear wheel made of a bakelized fabric, for example.

It is an object of the present invention to overcome at least in part the drawbacks described above with reference to the locking systems of the known art comprising a gear motor operatively connected to a locking device.

In particular, it is an object of the present invention to provide a locking system for a vehicle comprising a gear motor operatively connected to a locking device, which is less expensive than the locking systems described above with reference to the known art and which simultaneously allows a reduction in the overall size of the locking system.

Such objects are achieved by a locking system for a vehicle as defined in general in claim 1. Preferred and advantageous embodiments of the aforesaid locking system are defined in the appended dependent claims.

The present invention also relates to a vehicle as defined in claim 10.

The present invention also relates to a parking brake for a vehicle as defined in claim 11.

The invention will be better understood from the following detailed description of particular embodiments thereof given by way of non-limiting example, with reference to the accompanying drawings briefly described in the following paragraph.

DETAILED DESCRIPTION

Figure 1:
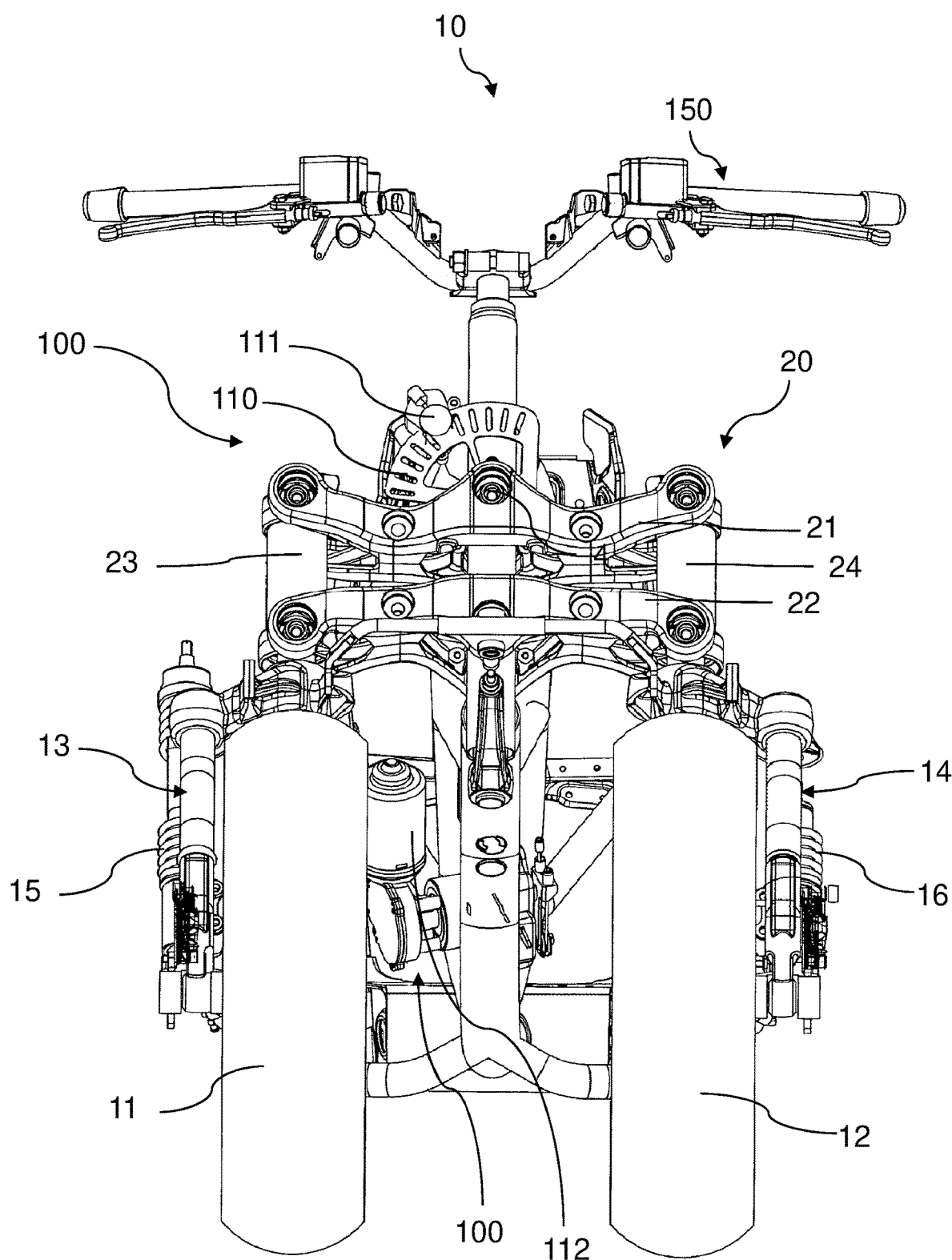
FIG. 1 shows a front view of a three-wheeled vehicle, devoid of fairing, provided with a locking system according to the present description.

Like or similar elements are indicated by the same reference numerals in the accompanying figures.

Figure 2:
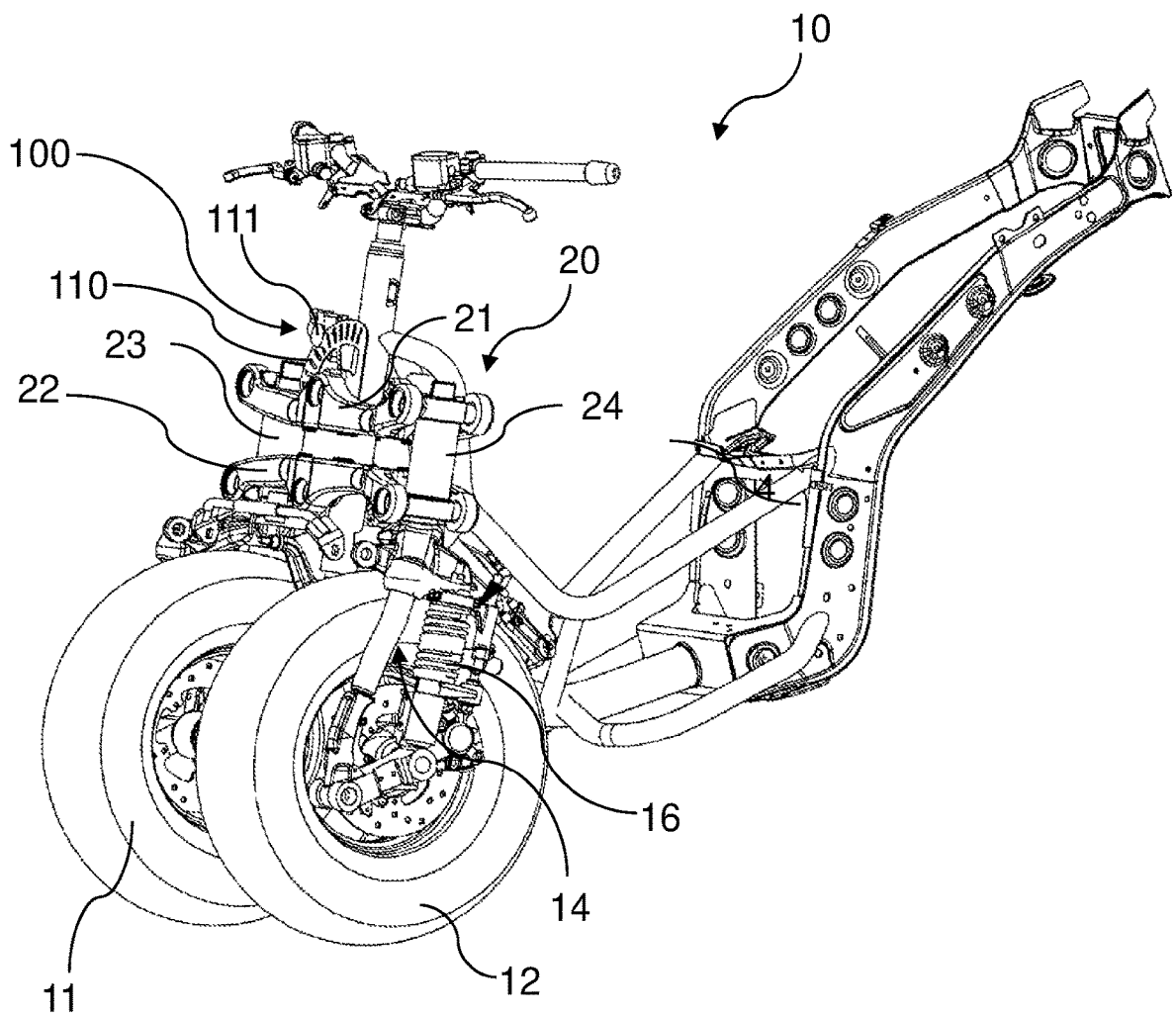
FIG. 2 shows a perspective view of the vehicle in FIG. 1, in which further parts of the vehicle, in addition to the fairing, have been removed.

A first embodiment of a vehicle, which is globally indicated by reference numeral 10, is shown in the accompanying FIGS. 1-2. In accordance with an embodiment, the vehicle 10 is a three-wheeled rolling vehicle 10. In particular, the vehicle 10 is provided, in a manner known per se, with two front steering wheels 11,12 and a rear wheel with a fixed axis (not shown). In accordance with an embodiment, the vehicle 10 comprises a steering handlebar 150 operatively connected to the front steering wheels 11,12. The vehicle 10 is shown in FIGS. 1 and 2 devoid of fairing. In particular, the vehicle is shown in FIG. 2 with different components removed, such as for example and without limitation the rear wheel with fixed axis.

In accordance with an embodiment, the two front wheels 11,12 are each provided with an independent front suspension 13,14 each of which is provided, in turn, with an independent shock absorber 15,16. The term suspension is understood to mean the mechanism adapted to connect the sprung masses of the vehicle to the unsprung masses of the vehicle. In accordance with an embodiment, the vehicle 10 comprises a steering mechanism comprising an articulated quadrilateral kinematic mechanism 20. In accordance with an embodiment, the mechanism 20 comprises two mutually opposite rigid horizontal crosspieces 21,22, which are preferably hinged to the frame of the vehicle 10 at the center line thereof. In particular, the rigid horizontal crosspieces 21,22 comprise an upper horizontal crosspiece 21 and a lower horizontal crosspiece 22. Furthermore, the mechanism 20 comprises two mutually opposite vertical uprights 23,24, preferably two sleeves 23,24, which are laterally hinged to the horizontal crosspieces 21, 22, and more preferably to the opposite ends of the crosspieces 21,22. In accordance with an embodiment, the vertical uprights 23,24 are rotatably connected to the independent front suspensions 13,14 in order to allow the wheels 11,12 to rotate with respect to the vehicle frame.

Again with reference to FIGS. 1-2, the vehicle 10 comprises a locking system 100. In accordance with an embodiment, the locking system 100 is an anti-roll locking system 100 which is configured to prevent the vehicle 10 from overturning, which situation may occur, for example, when the vehicle 10 is travelling below a predetermined speed or when the vehicle 10 is at a standstill or has stopped. In accordance with an embodiment, the locking system 100 comprises a locking device 111 and a gear motor 112, which are connected to each other, for example, by means of a Bowden cable. Preferably, the locking device 111 comprises a brake caliper 111, which is preferably fixed to the frame of the vehicle 10. The gear motor 112 is operatively connected to the locking device 111 and configured to cause the locking device 111 to take a stable locking state and a release state. In accordance with an embodiment, the locking system 100 comprises a stop element 110, which preferably comprises a brake disk portion 110, for example a portion 110 corresponding to a "fourth" of the brake disk. The stop element 110 is integral with an element of the articulated quadrilateral mechanism 20 in the rolling movements thereof. In particular, the stop element 110 is preferably fixed to the upper horizontal crosspiece 21. The locking device 111 is configured to lock the position of the stop element 110 with respect to the frame of the vehicle 10. Thereby, the locking device 111 prevents the movements of the mechanism 20 and thus the rolling of the vehicle 10. In other words, in accordance with a preferred embodiment, the brake caliper 111 is opened and closed by the gear motor 112. In particular, when the brake caliper 111 is closed (stable locking state), it locks the stop element 110 and thus the rolling movement of the vehicle 10. Instead, when it is opened (release state), the brake caliper 111 releases the stop element 110, thus allowing the rolling movement of the vehicle 10.

As an alternative to the architecture described above of a rolling vehicle with two front steering wheels, said vehicle can alternatively comprise a front end with a double articulated quadrilateral mechanism as better known from document WO2014009637A1 or a different arrangement of the stop and locking elements as better described in documents EP3397547A1 or EP2899107A1, which are incorporated herein in the present description.

Figure 3:
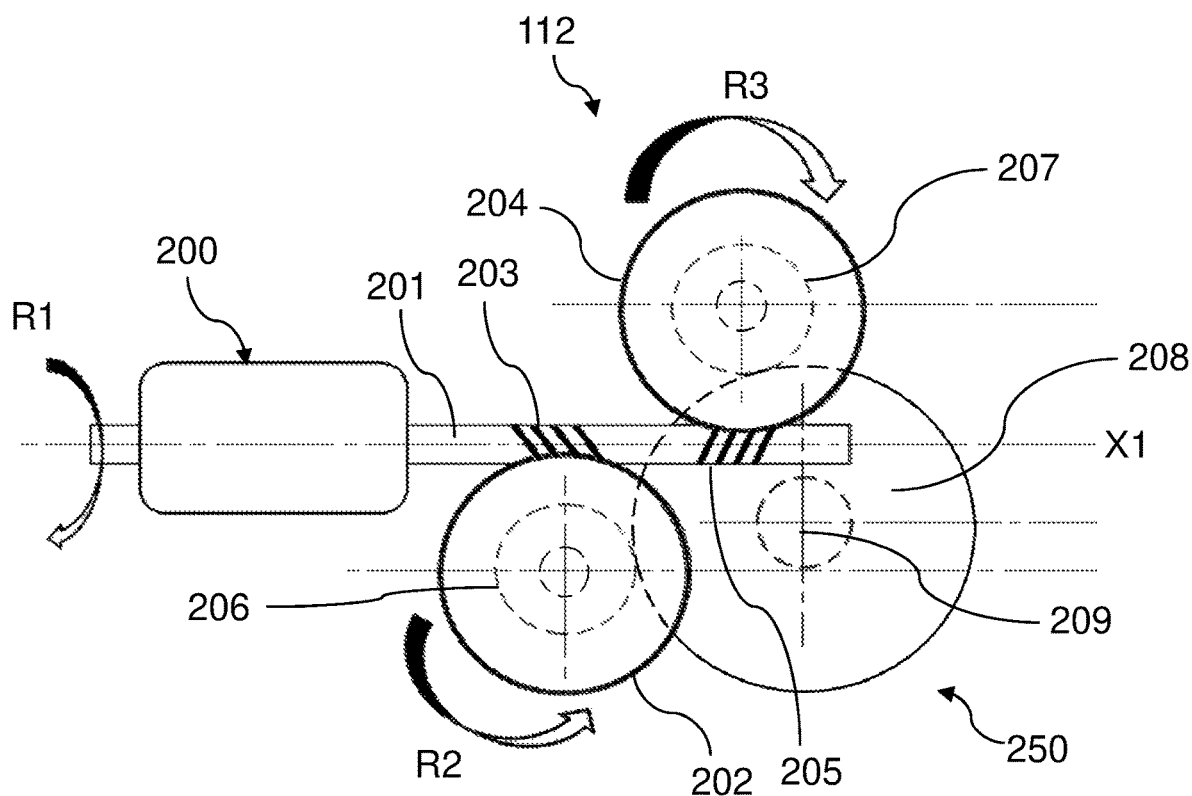
FIG. 3 shows a diagrammatic side view of a first embodiment of a gear motor of the locking system in FIG. 1.
Figure 4:
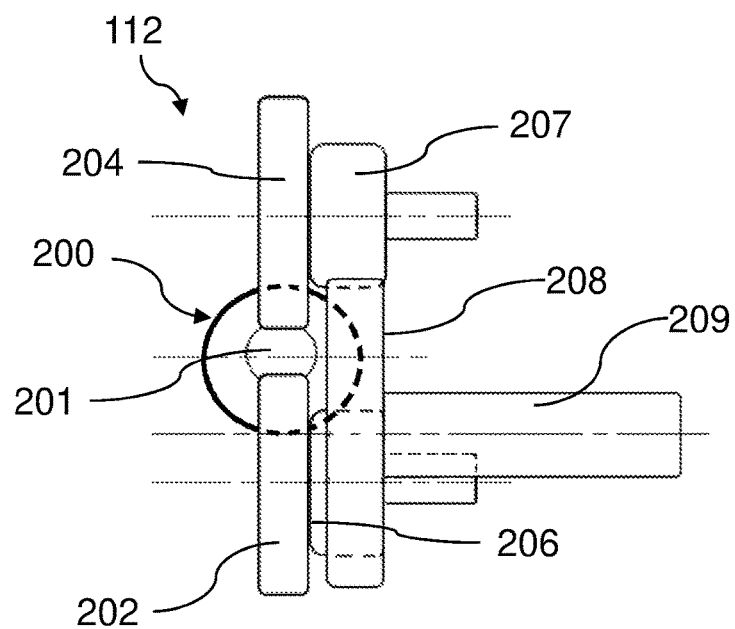
FIG. 4 shows a diagrammatic front view of the gear motor in FIG. 3.

Referring now to FIGS. 3-4, a first embodiment of the gear motor 112 is diagrammatically depicted. Specifically, the gear motor 112 comprises a drive motor 200, preferably an electric motor 200, having an input shaft 201. Furthermore, the gear motor 112 comprises a first transmission wheel 202 and a second transmission wheel 204. The first wheel 202 is coupled to a first portion 203 of the input shaft 201. The second wheel 204 is coupled to a second portion 205 of the input shaft 201. In accordance with an embodiment, the first and second portions 203,205 of the input shaft are aligned and spaced apart from each other along the axis X1 of the input shaft. It should be noted that providing a pair of transmission wheels coupled to the input shaft allows to increase the friction between the transmission wheels and the input shaft with respect to when a single transmission wheel is used. Advantageously, this ensures the irreversibility of the movement of the gear motor 112, i.e. the stability of the locking state of the locking device 111 of the locking system 100. Said stability is necessary for safety reasons for the motorcycle and the rider thereof, to prevent the vehicle from falling with the rider onboard when it is at a standstill with the rolling lock activated or only for the vehicle when it is parked. This technical solution also allows to employ both cheaper materials, such as plastic, for obtaining the transmission wheels, and transmission wheels with small dimensions, with a consequent reduction in the overall size of the system.

Advantageously, due to the increase in friction between the pair of transmission wheels and the input shaft, it is also possible to manufacture the input shaft with a smaller diameter than in the case of employing a single transmission wheel.

Again with reference to FIGS. 3-4, in accordance with an embodiment, the first and second transmission wheels 202, 204 are arranged on two opposite sides of the input shaft 201. In particular, the wheels 202,204 are arranged so as to balance the thrusts on the input shaft 201, thereby allowing a smaller bending stress of the input shaft 201.

In accordance with an embodiment, the first portion 203 and the second portion 205 of the input shaft 201 comprise a first endless screw portion 203 and a second endless screw portion 205, respectively. Furthermore, the first and second transmission wheels 202,204 both comprise helical teeth. In accordance with an alternative embodiment, the transmission wheels 202,204 could be friction wheels instead of gear wheels with helical teeth. In this case, the first and second endless screw portions 203,205 are not provided on the input shaft 201.

As shown in FIG. 3, in accordance with an embodiment, the helix of the first endless screw portion 203 and the helix of the second endless screw portion 205 have an opposite screwing direction. In particular, in accordance with an embodiment, the first endless screw portion 203 has a right thread, while the second endless screw portion 205 has a left thread.

In accordance with an embodiment, the angle of inclination of the helixes of the first and second endless screw portions 203,205 is less than 3° and the module of the first and second gear wheels 202,204 with helical teeth, i.e. the ratio of the primitive diameter to the number of teeth of each wheel 202,204, is less than or equal to 0.75. Conveniently, such a feature ensures the irreversibility of the movement of the gear motor 112 when the locking device 111 takes the locking state.

In accordance with an embodiment, the gear motor 112 comprises an output shaft 209, which is arranged transversely, preferably orthogonally to the input shaft 201. In accordance with an embodiment, the gear motor 112 comprises a gear train 250 interposed between the input shaft 201 and the output shaft 209 of the gear motor 112. The gear train 250 comprises the first and second transmission wheels 202,204. In accordance with an embodiment, the gear train 250 comprises a third and a fourth transmission wheel 206,207, which are rotationally integral with the first and second transmission wheels 202,204, respectively. Furthermore, in accordance with an embodiment, the gear train 250 comprises a fifth transmission wheel 208 to which the third and fourth transmission wheels 206,207 are coupled so as to transmit the movement to the fifth wheel 208. The fifth transmission wheel 208 is preferably rotationally integral with the output shaft 209. In accordance with an embodiment, the third, fourth and fifth transmission wheels 206, 207,208 are gear wheels with straight teeth. In accordance with an embodiment, said third and fourth wheels 206,207 have an equal diameter and both have a smaller diameter than the fifth wheel 208 for reducing the rotation speed of the output shaft 209. Preferably, said third and fourth wheels 206,207 have a smaller diameter than the first and second wheels 201,202, for further reducing the rotation speed of the output shaft 209.

With reference to FIG. 3, it is possible to note that when the input shaft 201 is rotated in the direction indicated by the arrow R1, the first wheel and the second wheel 202, 204 are rotated in the opposite directions indicated by the arrows R2 and R3, respectively.

In accordance with an embodiment, an actuator (not shown as known per se) which allows the locking device 111 to be controlled is fitted onto the output shaft 209. For example, such an actuator can comprise a support fitted onto the output shaft 209 on which a control cable, preferably a metal cable, can be wound and unwound, adapted to control the locking device 111. Alternatively, the aforesaid actuator can comprise a lever adapted to actuate a pump of a hydraulic circuit which is operatively connected to the locking device 111 or a lever adapted to actuate an electric control device of the locking device 111.

Figure 5:
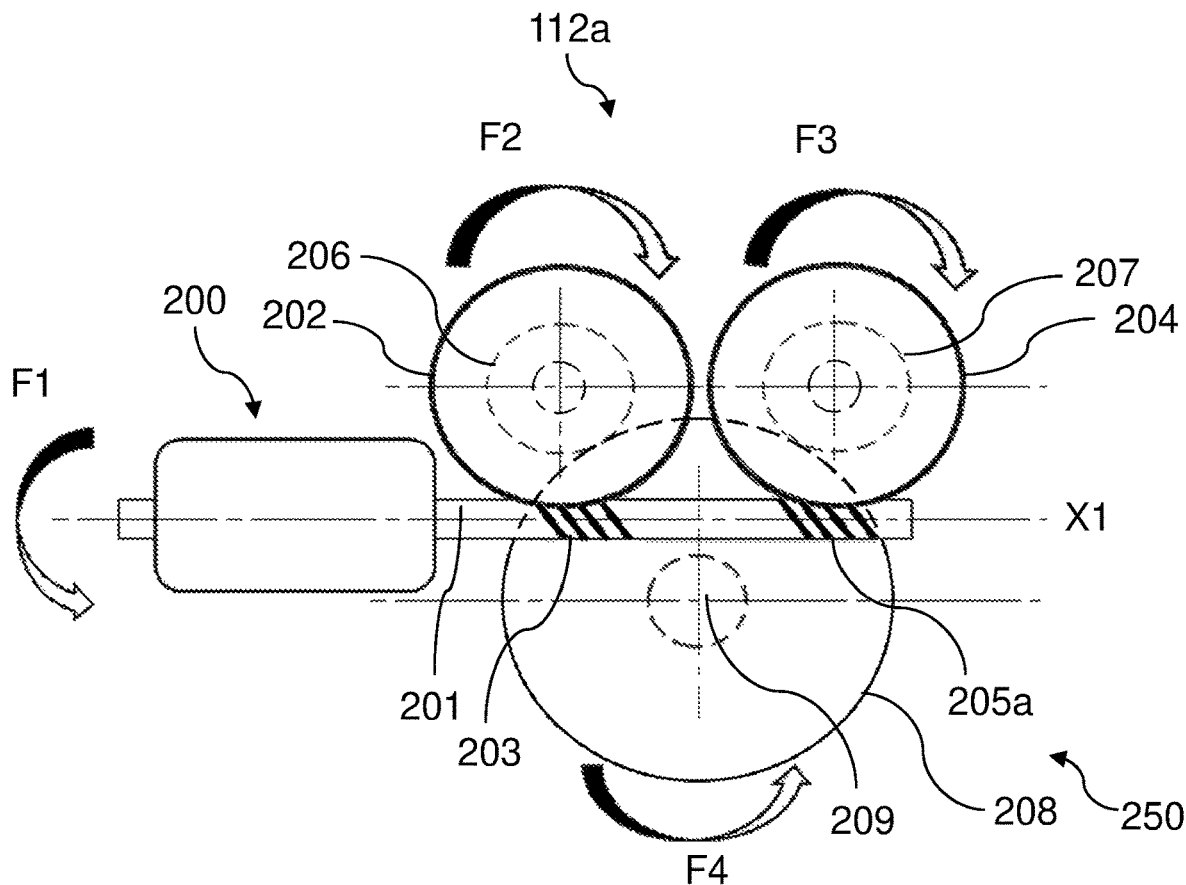
FIG. 5 shows a diagrammatic side view of a second embodiment of a gear motor of the locking system in FIG. 1.
Figure 6:
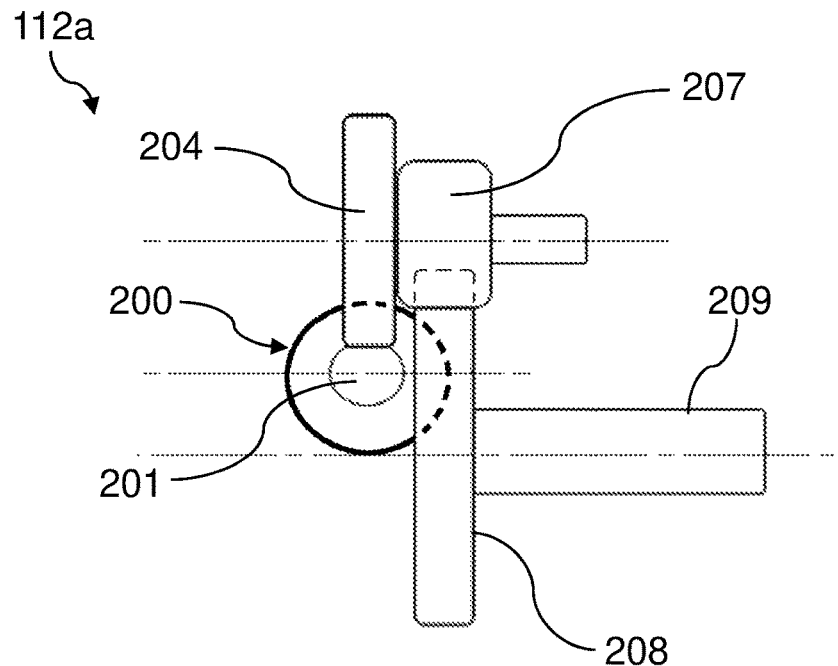
FIG. 6 shows a diagrammatic front view of a gear motor in FIG. 5.

Referring now to FIGS. 5-6, a second embodiment of the gear motor 112 is diagrammatically shown. The gear motor in accordance with such a second embodiment is globally indicated by reference numeral 112a. The above description for the gear motor 112 can generally be applied to the gear motor 112a as far as compatible. Therefore, for brevity of the description, the structure of the gear motor 112a will not be described in detail. Specifically, the gear motor 112a in FIGS. 5-6 essentially differs from the gear motor 112 shown in FIGS. 3-4 in that the first and second transmission wheels 202,204 are arranged on the same side of the input shaft 201. Furthermore, in accordance with an embodiment, the input shaft 201 of the gear motor 112a comprises a second endless screw portion 205a, the helix of which has a concordant screwing direction with that of the thread of the helix of the first endless screw portion 203 of the shaft 201. It should be noted that arranging the first and second transmission wheels 202,204 on the same side of the input shaft 201 advantageously allows to simplify the structure of the input shaft 201. Thereby, in fact, it is possible to provide a single thread on the input shaft 201, the helix of which has only one screwing direction and to which both of the transmission wheels 202, 204 can be coupled. In accordance with an embodiment, in order to reduce the bending stress of the input shaft 201, a contrast element (not shown) can be provided on the opposite side of the input shaft 201 with respect to the side on which the first and second transmission wheels 202,204 are arranged.

With reference to FIG. 5, it is possible to note that when the input shaft 201 is rotated in the direction indicated by the arrow F1, the first wheel and the second wheel 202, 204 are rotated in the same direction indicated by the arrows F2 and F3, respectively. The third and fourth transmission wheels 206,207 rotate instead the fifth wheel 208 in the direction indicated by the arrow F4, i.e. in the opposite direction with respect to the rotation directions of the first and second wheels 202,204.

Therefore, based on the above explanation, it is possible to understand how a locking system for a vehicle of the type described above allows to achieve the aforesaid objects with reference to the prior art.

Nevertheless, it is noted that the teachings of the present description are not limited to an anti-roll locking system for a rolling vehicle with three wheels provided with a front steering system comprising an articulated quadrilateral kinematic mechanism but they can be applied to other types of systems. For example, and without any limitation, in the light of the teachings of the present description it is apparent to those skilled in the art that a parking brake for a vehicle comprising a locking system according to the present description is also provided.

Without prejudice to the principle of the invention, the embodiments and the constructional details may be broadly varied with respect to the above description disclosed by way of a non-limiting example, without departing from the scope of the invention as defined in the appended claims.

The invention claimed is:

1. An anti-roll locking system for a rolling vehicle with three wheels provided with a front steering system comprising an articulated quadrilateral kinematic mechanism, said locking system comprising:
   a locking device; and
   a gear motor operatively connected to the locking device and configured to cause the locking device to take a stable locking state and a release state;
   wherein the gear motor comprises:
   a drive motor having an input shaft;
   a first transmission wheel coupled to a first portion of said input shaft; and
   a second transmission wheel coupled to a second portion of said input shaft.

2. The locking system according to claim 1, wherein the first and second transmission wheels are arranged on two opposite sides of the input shaft.

3. The locking system according to claim 1, wherein the first and second transmission wheels are arranged on the same side as the input shaft.

4. The locking system according to claim 1, wherein the first portion and the second portion of the input shaft comprise a first worm screw portion and a second worm screw portion, respectively, and wherein both the first and second transmission wheels comprise helical teeth.

5. The locking system according to claim 4, wherein a helix of the first worm screw portion and a helix of the second worm screw portion have an opposite screwing direction.

6. The locking system according to claim 4, wherein a helix of the first worm screw portion and a helix of the second worm screw portion have a concurrent screwing direction.

7. The locking system according to claim 4, wherein an inclination angle of helices of the first and second worm screw portions is less than 3°, and wherein a module of the first and second toothed wheels having helical teeth is less than or equal to 0.75.

8. The locking system according to claim 1, wherein the gear motor comprises an output shaft which is arranged transversely to the input shaft.

9. The locking system according to claim 8, wherein said first wheel is rotationally integral with a third wheel, said second wheel is rotationally integral with a fourth wheel having a diameter equal to said third wheel, and wherein said output shaft is rotationally integral with a fifth wheel having a greater diameter than said third and fourth wheels; said third, fourth and fifth wheels (206,207,208) being operatively coupled to one another to transmit the motion from the input shaft to the output shaft.

10. A vehicle comprising a locking system according to claim 1.

11. A parking brake for a vehicle comprising a locking system according claim 1.

* * * * *